(12) United States Patent
Bennett et al.

(10) Patent No.: US 9,292,702 B2
(45) Date of Patent: Mar. 22, 2016

(54) DYNAMIC SWITCHING OF SECURITY CONFIGURATIONS

(75) Inventors: Paul W. Bennett, Austin, TX (US); Elisa A. Ferracane, Austin, TX (US); Daniel E. Morris, Austin, TX (US); Michael C. Thompson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1663 days.

(21) Appl. No.: 12/544,745

(22) Filed: Aug. 20, 2009

(65) Prior Publication Data

US 2011/0047589 A1    Feb. 24, 2011

(51) Int. Cl.
G06F 21/00    (2013.01)
G06F 21/62    (2013.01)

(52) U.S. Cl.
CPC .................. G06F 21/6209 (2013.01)

(58) Field of Classification Search
CPC .................................................. G06F 21/6209
USPC ............................................................. 726/1
See application file for complete search history.

(56) References Cited

U.S. PATENT DOCUMENTS

| | | | |
|---|---|---|---|
| 5,434,562 A * | 7/1995 | Reardon | 726/34 |
| 6,243,815 B1 * | 6/2001 | Antur et al. | 726/11 |
| 6,487,665 B1 * | 11/2002 | Andrews et al. | 726/26 |
| 7,089,584 B1 | 8/2006 | Sharma et al. | |
| 7,171,685 B2 | 1/2007 | Batra et al. | |
| 7,373,654 B1 | 5/2008 | Reid | |
| 8,024,789 B2 * | 9/2011 | Kawakami et al. | 726/15 |
| 2004/0128546 A1 * | 7/2004 | Blakley et al. | 713/201 |
| 2004/0255146 A1 * | 12/2004 | Asher et al. | 713/200 |
| 2005/0102534 A1 * | 5/2005 | Wong | 713/201 |
| 2005/0120122 A1 * | 6/2005 | Farnham | 709/230 |
| 2005/0149612 A1 * | 7/2005 | Messinger et al. | 709/200 |
| 2005/0183084 A1 * | 8/2005 | Cuomo et al. | 718/100 |
| 2005/0198530 A1 | 9/2005 | Chess et al. | |
| 2005/0198691 A1 * | 9/2005 | Xiang et al. | 726/3 |
| 2005/0283604 A1 | 12/2005 | Deshpande et al. | |
| 2006/0021016 A1 * | 1/2006 | Birk et al. | 726/10 |
| 2006/0259435 A1 * | 11/2006 | Moritzen | 705/57 |
| 2006/0294041 A1 * | 12/2006 | Baartman et al. | 707/1 |

(Continued)

OTHER PUBLICATIONS

Espacenet search, Espacenet Result List, Jan. 2012.*

(Continued)

*Primary Examiner* — Shan Elahi
(74) *Attorney, Agent, or Firm* — Parashos T. Kalaitzis; Robert C. Rolnik

(57) ABSTRACT

Disclosed is a computer implemented method, computer program product, and apparatus to switch security configurations. A data processing system accesses a first security configuration via a thread of execution, wherein a security configuration comprises at least one security parameter. The thread receives an incoming request. The thread switches to a second security configuration that specifies a resource, based on the incoming request, responsive to receiving the incoming request. The thread stores the second security configuration or a reference to the second security configuration to a stack. The thread authenticates the incoming request based on the second security configuration. The thread grants or denies access to the resource. The thread executes a method referenced in the incoming request. The thread restores to a first security configuration, responsive to completing the method.

5 Claims, 3 Drawing Sheets

(56) References Cited

U.S. PATENT DOCUMENTS

| | | |
|---|---|---|
| 2008/0141336 A1 | 6/2008 | Haller |
| 2008/0168528 A1 | 7/2008 | Lin et al. |
| 2008/0189711 A1* | 8/2008 | Cavage et al. ............... 718/102 |
| 2008/0281861 A1* | 11/2008 | Booz et al. ............... 707/103 R |
| 2009/0106555 A1 | 4/2009 | Buer |
| 2010/0005529 A1* | 1/2010 | Hemade ..................... 726/22 |
| 2010/0262577 A1 | 10/2010 | Pulfer et al. |

OTHER PUBLICATIONS

Maunder et al: "Designing a 'Universal' Web Application Server"; ACM Digital Library; Apr. 13-15, 2009.

Hafiz et al; "Security-Oriented Program Transformations [Extended Abstract]"; ACM Digital Library; Apr. 13-15, 2009.

Wang Yang et al; "Management Architecture and Secure Policy based on Samba Server"; INSPEC/Control Engineering China, vol. 12, No. 1, pp. 57-60, Jan. 2005.

\* cited by examiner

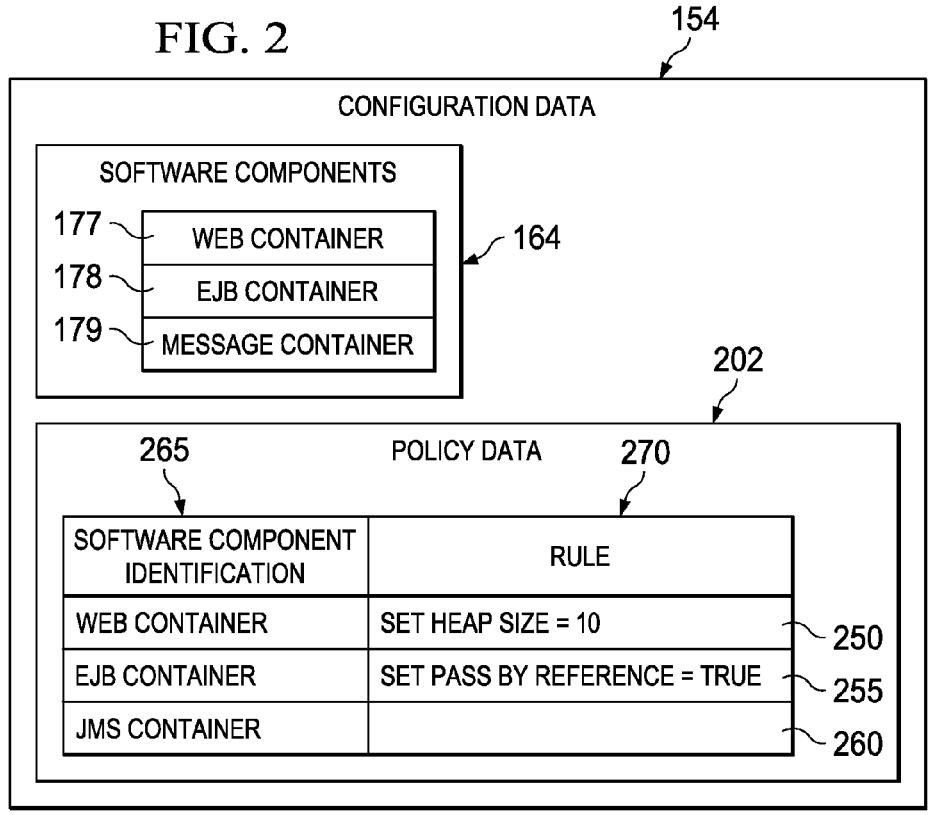
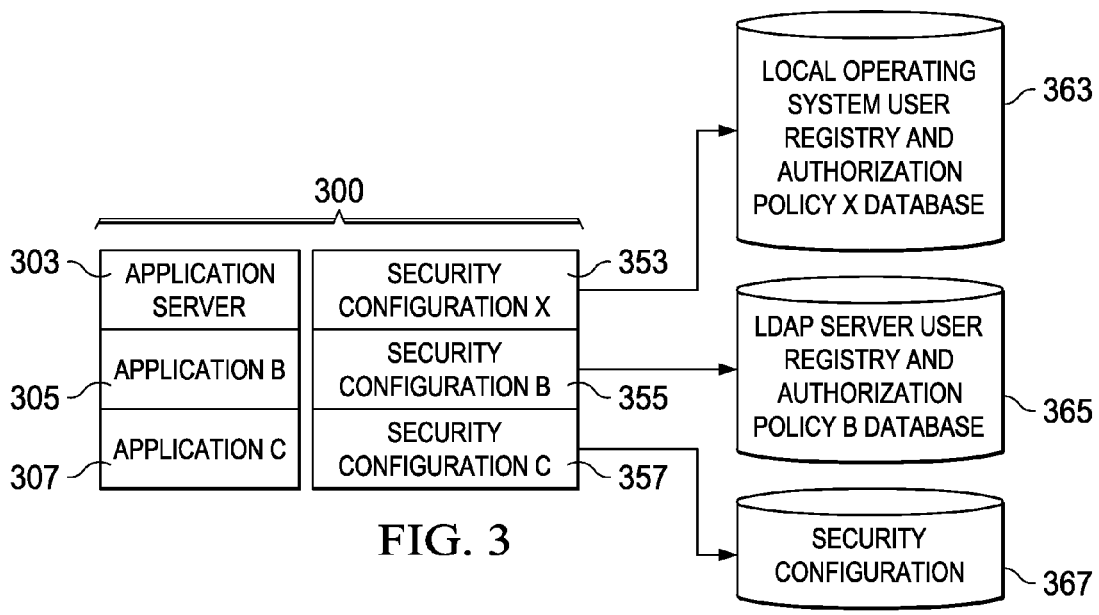

… (1)

DYNAMIC SWITCHING OF SECURITY CONFIGURATIONS

BACKGROUND OF THE INVENTION

1. Field of the Invention

The present invention relates generally to a computer implemented method, data processing system, and computer program product for setting controls on resource access in data processing systems. More specifically, the present invention relates to changing a security configuration associated with a thread.

2. Description of the Related Art

Security is a core feature of enterprise computing. As computing environments have become more complex, so have the authentication and authorization of security schemes within these environments. Authentication is the process of establishing whether a client is who or what it claims to be in a particular computing environment. A client can be an end-user, a machine, or an application. An authenticated client may rely on one or more applications, each of which may have a different security configuration associated therewith. An authentication mechanism in WebSphere Application Server typically collaborates closely with a user registry.

A user registry is the user and groups account repository that an authentication mechanism consults when performing authentication. The authentication mechanism is responsible for creating a credential, which is an internal product representation of a successfully authenticated client user. Not all credentials are created equally. The abilities of the credential are determined by the configured authentication mechanism.

SUMMARY OF THE INVENTION

The present invention provides a computer implemented method, data processing system, and apparatus to switch security configurations. A data processing system accesses a first security configuration via a thread of execution, wherein a security configuration comprises at least one security parameter. The thread receives an incoming request. The thread switches to a second security configuration that specifies a resource, based on the incoming request, responsive to receiving the incoming request. The thread stores the second security configuration or a reference to the second security configuration to a stack. The thread authenticates the incoming request based on the second security configuration. The thread grants or denies access to the resource. The thread executes a method referenced in the incoming request. The thread restores to a first security configuration, responsive to completing the method.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a block diagram of configuration data in accordance with an illustrative embodiment of the invention;

FIG. 3 is a data structure of associations between applications and corresponding security configurations in accordance with an illustrative embodiment of the invention;

DETAILED DESCRIPTION OF THE PREFERRED EMBODIMENT

Figure 1:
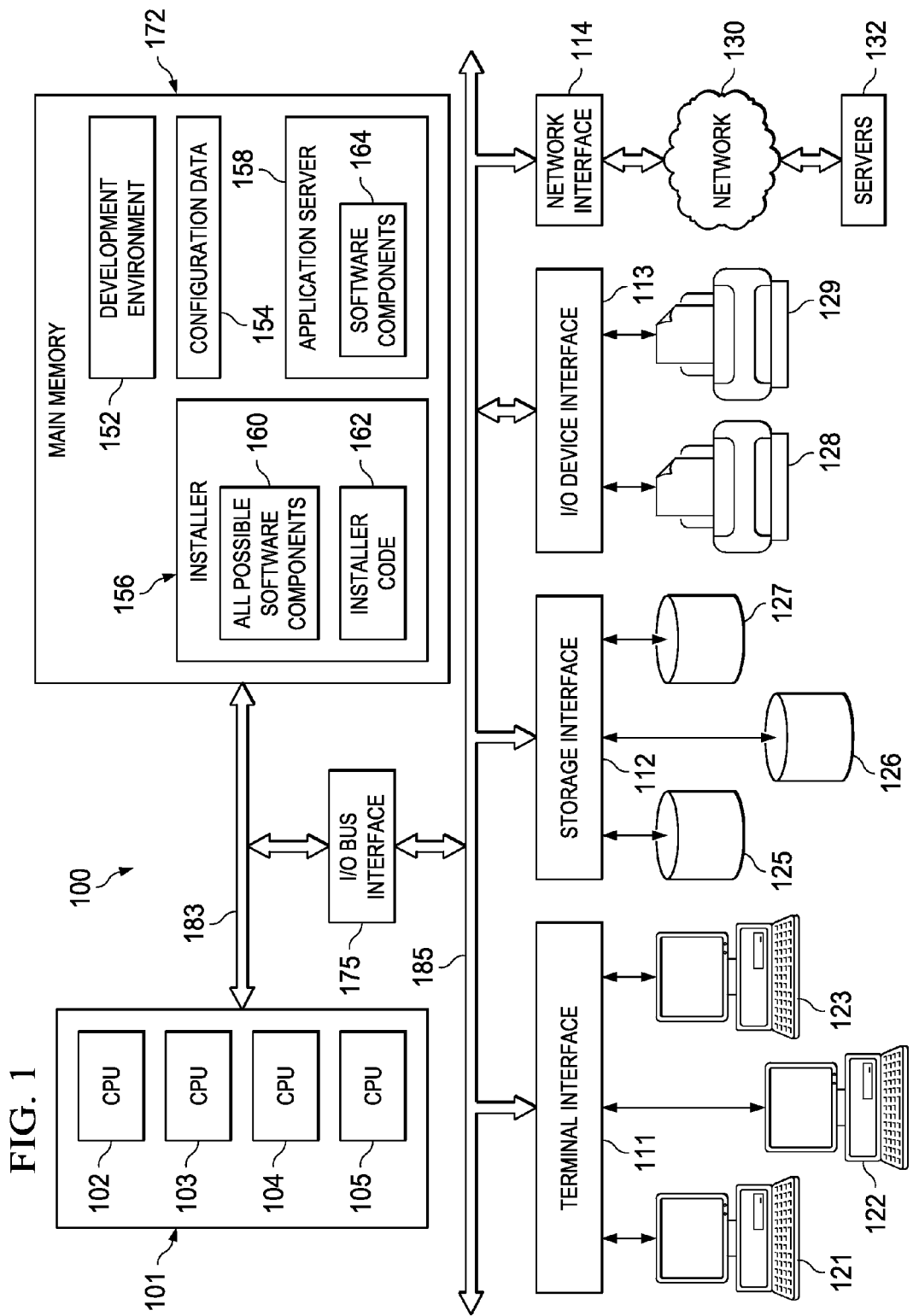
FIG. 1 is a high-level block diagram representation of a computer system connected via network to servers in accordance with an illustrative embodiment of the invention.

FIG. 1 is a high-level block diagram representation of a computer system 100 connected via network 130 to servers 132, in accordance with an illustrative embodiment. The terms "computer" and "server" are used for convenience only, and an electronic device that acts as a server in one embodiment may act as a client in another embodiment, and vice versa. In an embodiment, the hardware components of computer system 100 may be implemented by an eServer iSeries® computer system available from International Business Machines of Armonk, N.Y. iSeries is a trademark of International Business Machines Corp. However, those skilled in the art will appreciate that the mechanisms and apparatus of embodiments of the present invention apply equally to any appropriate computing system.

Computer system 100 includes one or more processor 101, main memory 172, terminal interface 111, storage interface 112, I/O (Input/Output) device interface 113, and communications/network interfaces 114, all of which are coupled for inter-component communication via memory bus 183, I/O bus 185, and I/O bus interface unit 175.

Computer system 100 contains one or more general-purpose programmable central processing units (CPUs) 102, 103, 104, and 105, generically referred to as processor 101. In an embodiment, computer system 100 contains multiple processors typical of a relatively large system; however, in another embodiment computer system 100 may alternatively be a single CPU system. Each processor 101 executes instructions stored in main memory 172 and may include one or more levels of on-board cache.

Main memory 172 can be a random-access semiconductor memory for storing data and programs. In another embodiment, main memory 172 represents the entire virtual memory of computer system 100, and may include the virtual memory of other computer systems coupled to computer system 100 or connected via network 130. Main memory 172 is conceptually a single monolithic entity, but in other embodiments the main memory 172 is a more complex arrangement, such as a hierarchy of caches and other memory devices. For example, main memory 172 may exist in multiple levels of caches, and these caches may be further divided by function, so that one cache holds instructions while another holds non-instruction data, which is used by the processor or processors. Main memory 172 may be further distributed and associated with different CPUs or sets of CPUs, as is known in any of various so-called non-uniform memory access (NUMA) computer architectures.

Main memory 172 can include development environment 152, configuration data 154, an installer 156, and an application server 158. Although the development environment 152, the configuration data 154, the installer 156, and the application server 158 are illustrated as being contained within the main memory 172 in the computer system 100, in other embodiments some or all of them may be on different computer systems (for example, the servers 132) and may be accessed remotely. These resources may be accessed, for example, via network 130. Computer system 100 may use virtual addressing mechanisms that allow the programs of computer system 100 to behave as if they only have access to a large, single storage entity instead of access to multiple, smaller storage entities. Thus, while development environment 152, configuration data 154, installer 156, and application server 158 are illustrated as being contained within main memory 172, these elements are not necessarily all completely contained in the same storage device at the same time. Further, although development environment 152, configuration data 154, installer 156, and application server 158 are illustrated as being separate entities, in other embodiments some of them, or portions of some of them, may be packaged together.

In an illustrative embodiment, application server 158 is implemented via Websphere™. WebSphere is a trademark of the International Business Machines Corporation in the USA and/or other countries. In another embodiment, application server 158 is a software component-based product that resides in the middle-tier of a server-centric architecture. Application server 158 provides middleware services for security and state maintenance, along with data access and persistence. In an embodiment, application server 158 may be a Java application server based on the Java 2 Platform, Enterprise Edition (J2EE™), but in other embodiments any appropriate platform may be used. Java and J2EE are a trademarks of Sun Microsystems Inc. J2EE uses a multi-tier distributed model, which generally includes a client tier, a middle tier, and an Enterprise Information System (EIS) tier. The client tier can be one or more applications or browsers. The J2EE Platform is in the middle tier and consists of a web server and an Enterprise Java Beans (EJB) server. Enterprise JavaBeans (EJB) are Java software components that typically implement the business logic of Java 2 Platform, Enterprise Edition (J2EE) applications as well as access data. Additional subtiers in the middle tier may also exist. The EIS tier may include existing applications, files, and databases. For the storage of business data, the J2EE platform uses a database that is accessible, for example, through a Java Database Connectivity (JDBC), Structured Query Language for Java (SQLJ), or JDO Java Data Objects Application Program Interface (API). The database may be accessible from web components, enterprise beans, and application client components. Application server 158 includes software components 164. A software component or application is a software package that encapsulates a set of related functions and/or data. The software component can be objects stored to memory of a data processing system. Examples of software components 164 include a web container, an EJB container, a Java message service (JMS), or any other appropriate software component.

Development environment 152 is a program that assists a computer programmer in developing the configuration data 154. Development environment 152 produces the configuration data 154 as output. In various embodiments, development environment 152 may include a source code editor, a compiler and/or interpreter, build-automation tools, a debugger, a version control system, tools to simplify the construction of a Graphical User Interface (GUI), a class browser, an object inspector, and a class hierarchy diagram. In an embodiment, development environment 152 may be implemented via an enhanced Websphere Studio Application Developer (WSAD), but in another embodiment development environment 152 may be implemented via any appropriate development environment.

Configuration data 154 represents an application that can be deployed in application server 158. In an illustrative embodiment, configuration data 154 may be implemented as an Enterprise Archive (EAR) file that represents a J2EE application that can be deployed in a WebSphere application server. However, in other embodiments, any appropriate type of configuration data may be used. EAR files are standard Java archive files Oar files) and have the same format. An EAR file can consist of one or more web application modules, one or more EJB modules, one or more application client modules, additional jar files required by the application, and any combination of these modules. The modules that make up EAR files are themselves packaged in archive files specific to their types; for example, a Web module contains Web archive files and an EJB module contains Java archive files. EAR files also contain a deployment descriptor that describes the contents of the application and contains instructions for the entire application, such as security settings to be used in the run-time environment. A deployment descriptor can be, for example, an XML file. Configuration data 154 is further described below with reference to FIG. 2.

Installer 156 includes a list of all possible software components 160 and installer code 162. Installer code 162 may install software components 164 into the application server 158 based on configuration data 154. In various embodiments, installer code 162 may be an operating system, a portion of an operating system, an application, an application programming interface (API), a browser, a browser plug-in, or the like. Installer code 162 includes instructions capable of executing on processor 101 or statements capable of being interpreted by instructions executing on processor 101 to perform the functions as further described below. In another embodiment, installer code 162 may be implemented in microcode or firmware. In another embodiment, installer code 162 may be implemented in hardware via logic gates and/or other appropriate hardware techniques in lieu of or in addition to a processor-based system.

Memory bus 183 provides a data communication path for transferring data among processor 101, main memory 172, and I/O bus interface unit 175. I/O bus interface unit 175 is further coupled to system I/O bus 185 for transferring data to and from the various I/O units. I/O bus interface unit 175 communicates with multiple I/O interface units 111, 112, 113, and 114, which are also known as I/O processors (IOPs) or I/O adapters (IOAs), through system I/O bus 185. System I/O bus 185 may be, for example, an industry standard PCI bus, or any other appropriate bus technology.

The I/O interface units support communication with a variety of storage and I/O devices. For example, terminal interface 111 supports the attachment of one or more user terminals 121, 122, and 123. Storage interface 112 supports the attachment of one or more direct access storage devices (DASD) 125, 126, and 127. The direct access storage devices may be rotating magnetic disk drive storage devices or other devices, including arrays of disk drives configured to appear as a single large storage device to a host. The contents of main memory 172 may be stored to and retrieved from the direct access storage devices 125, 126, and 127, as needed.

I/O and other device interface 113 provides an interface to any of various other input/output devices or devices of other types. Two such devices, printer 128 and fax machine 129, are shown in the exemplary embodiment of FIG. 1, but in other embodiments, many other such devices may exist, which may be of differing types. Network interface 114 provides one or more communication paths from computer system 100 to other digital devices and computer systems. Such paths may include, for example, one or more networks 130.

Although memory bus 183 is shown in FIG. 1 as a relatively simple, single bus structure providing a direct communication path among processors 101, main memory 172, I/O bus interface 175, and memory bus 183 may comprise multiple buses or communication paths. Such buses or communication paths may be arranged in any of various forms, such as point-to-point links in hierarchical, star or web configurations, multiple hierarchical buses, parallel and redundant paths, or any other appropriate type of configuration. Furthermore, while I/O bus interface 175 and I/O bus 185 are shown as single respective units, computer system 100 may contain multiple I/O bus interface units and/or multiple I/O buses. While multiple I/O interface units are shown, which separate system I/O bus 185 from various communications paths running to the various I/O devices, in other embodiments some or all of the I/O devices are connected directly to one or more system I/O buses.

Computer system 100 depicted in FIG. 1 may have multiple attached terminals 121, 122, and 123, such as might be typical of a multi-user "mainframe" computer system. Typically, the actual number of attached devices can be greater than those shown in FIG. 1. Computer system 100 may alternatively be a single-user system, typically containing only a single user display and keyboard input, or may be a server or similar device which has little or no direct user interface, but receives requests from other computer systems and from threads operating within the computer system. In other embodiments, computer system 100 may be implemented as a personal computer, portable computer, laptop or notebook computer, Personal Digital Assistant (PDA), tablet computer, pocket computer, telephone, pager, automobile, teleconferencing system, appliance, or any other appropriate type of electronic device.

Network 130 may be any suitable network or combination of networks and may support any appropriate protocol suitable for communication of data and/or code to or from computer system 100. In various embodiments, network 130 may represent a storage device or a combination of storage devices, connected either directly or indirectly to computer system 100. In an embodiment, network 130 may support Infiniband™. InfiniBand is a trademark of the InfiniBand Trade Association. In another embodiment, network 130 may support wireless communications. In another embodiment, network 130 may support hard-wired communications, such as a telephone line or cable. In another embodiment, network 130 may support the Ethernet Institute of Electrical and Electronics Engineers (IEEE) 802.3x specification. In another embodiment, network 130 may be the Internet and may support Internet Protocol (IP).

In another embodiment, network 130 may be a local area network (LAN) or a wide area network (WAN). In another embodiment, network 130 may be a hotspot service provider network. In another embodiment, network 130 may be an intranet. In another embodiment, network 130 may be a General Packet Radio Service (GPRS) network. In another embodiment, network 130 may be any appropriate cellular data network or cell-based radio network technology. In another embodiment, network 130 may be an IEEE 802.11B wireless network. In still another embodiment, network 130 may be any suitable network or combination of networks. Although one network 130 is shown, in other embodiments any number (including zero) of networks (of the same or different types) may be present.

The servers 132 may include some or all of the hardware and/or software elements previously described above for the computer system 100. In another embodiment, the servers 132 are optional, not present, or not used.

It should be understood that FIG. 1 is intended to depict the representative major components of computer system 100, network 130, and servers 132 at a high level. In addition, individual components may have greater complexity than represented in FIG. 1, and components other than or in addition to those shown in FIG. 1 may be present. Also, the number, type, and configuration of such components may vary. Several particular examples of such additional complexity or additional variations are disclosed herein; it being understood that these are by way of example only and are not necessarily the only such variations.

The various software components illustrated in FIG. 1 may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100. When the instructions are read and executed by one or more processors 101, the computer system 100 performs the actions necessary to execute steps or elements which comprise the various aspects of an illustrative embodiment.

FIG. 2 is a block diagram of example configuration data 154, in accordance with an illustrative embodiment. Configuration data may be in main memory 172 of FIG. 1. The configuration data includes software components 164 and policy data 202. Software components 164 may include, for example, software components such as web container 177, EJB container 178, and message container 179, but in other embodiments, any number of software components and any appropriate type of software component may be present. Items 177, 178, and 179 of software components 164, may be software components of an application that may be installed to an application server, e.g., application server 158 of FIG. 1.

Policy data 202 includes records 250, 255, and 260, but in other embodiments, any number of records with any appropriate data may be present. Each of records 250, 255, and 260 include software component identifier field 265 and rule field 270. In other embodiments, more or fewer fields may be present.

Software component identifier field 265 identifies software component 164, which may be installed in application server 158. Rule field 270 identifies a rule that is to be applied to application server 158 or software components 164 if the software component identified by the corresponding software component identifier field 265 is installed. For example, rule 270 in record 250 may indicate a heap-size setting for the associated software component identifier 265 in application server 158, and the rule 270 in the record 255 indicates whether parameters are to be passed within the associated software component 265 in application server 158 by reference or by value. In an embodiment, rules 270 may be performance-tuning rules for application server 158, but in other embodiments, any appropriate rules may be used.

The terminology used herein is for describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

One or more embodiments may allow a thread to rotate through different security configurations in accordance with an application's association to a security configuration. A mechanism to push and pop security associations from a stack can avoid re-initializing one or more processes of an application server.

FIG. 3 is a data structure of associations between applications and corresponding security configurations in accordance with an illustrative embodiment of the invention. A security configuration is at least one security parameter. The security parameter is associated with at least one application or resource.

The security parameter can be one selected from the group consisting of an authentication mechanism, an authorization data, a credential, a user registry, a login module, a secure channel configuration, an encryption key store and a trust store. The security configuration may reference or specify at least one resource. A security configuration may be referred to as a "security domain" within WebSphere Application Server environment. An application is one or more instances of a program that generally performs a service for a user. An application can include data and computer program instructions that achieve a business objective, for example, a database program such as Oracle®. A resource is high-level code, executable code, data, or any combination of these things. A resource can be an application or an object class. Each resource may exist in storage, in memory, or as code executing on one or more processors.

Security configurations may take many forms. For example, a user registry is a list of users who have registered with the web server. The user registry can contain information about the user that allows the web server to authenticate and authorize the user, and to customize information presented to the user. A login module is used to create a propagation token on the thread of execution. A login module may also associate security attributes to a propagation token for propagation downstream. A secure channel configuration is a configuration that permits asynchronous or synchronous communication with a computer based on a shared secret. One example is, secured sockets layer (SSL). An encryption key store is a public key associated with a private key.

Application server 303 may be associated with security configuration X 353, in table 300. Security configuration X can be a data structure, for example, data structure 363. Data structure 363 can be a combination of a local operating system user registry with an authorization policy database, in this case, labeled 'X'. This data structure may be a default or starting association of a thread executing on the application server. In other words, the beginning security configuration may be a default security configuration. Accordingly, when all other security configurations are popped off a stack, explained further below, only the default security configuration may remain. The application server can be, for example, application server 158 of FIG. 1. As explained further below, such a default security configuration may be placed first into a stack. In an alternative embodiment, a default security configuration may not be directly referenced in the stack. Rather, program code may rely a default security configuration when the stack is empty, as can be the case when a data processing system is initialized. Accordingly, after the stack is emptied, this alternative embodiment may treat the active security configuration to be the default security configuration. In short, the default security configuration is used in the absence of data referenced by a top of stack.

Application B 305 may be associated with security configuration B 355. Security configuration B can be a data structure, for example, data structure 365. This data structure may be a combination of Lightweight Directory Access Protocol (LDAP) server user registry and an authorization policy B database, labeled 'B'.

In addition, application C 307 may be associated with security configuration C 357. Security configuration C may be yet another data structure that defines security parameters, shown as empty data structure 367 in this illustration. Application server 303 may correspond to application server 158 of FIG. 1. Similarly, application B may be, e.g., web container 177 of FIG. 2. In addition, application C may be, for example, EJB container 178 of FIG. 2.

Figure 4:
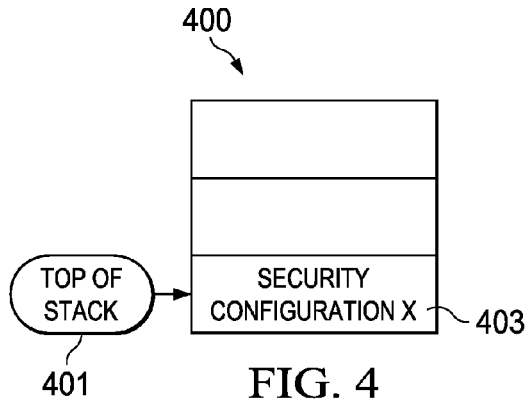
FIG. 4 is a data structure for identifying a currently active security configuration in accordance with an illustrative embodiment of the invention.

FIG. 4 is a data structure for identifying a currently active security configuration in accordance with an illustrative embodiment of the invention. The data structure may be stack 400. A stack is a data structure to which data can be added by reference to a stack pointer and removed by reference to stack pointer 401, such as, top of stack. Top of stack 401 points to security configuration X 403 in stack 400. A push instruction instructs a data processing system to add data to the top of the stack. Conversely, a pop instruction instructs a data processing system to remove a top stack item by, for example, moving the stack pointer to a previous stack position. A stack is sometimes called a Last-In First-Out (LIFO) data structure. The stack pointer is updated to reflect changes in the security configuration associated with a currently executing thread, as shown below with respect to FIGS. 4, 6, and 7.

Figure 5:
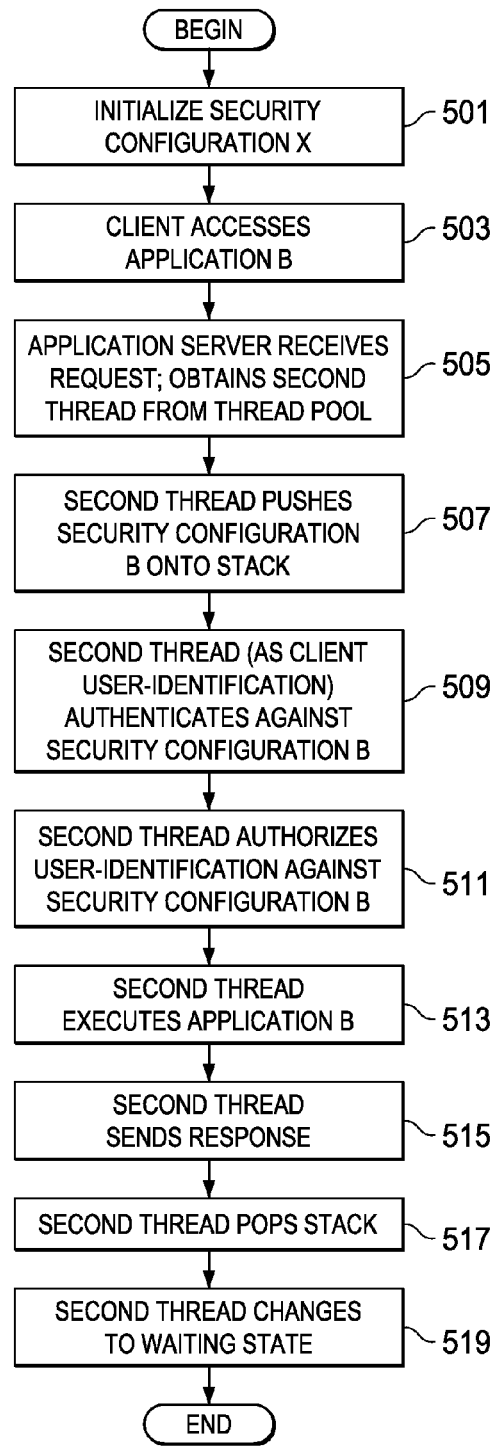
FIG. 5 is a flowchart of steps corresponding to at least two threads in accordance with an illustrative embodiment of the invention.

FIG. 5 is a flowchart of steps corresponding to at least two threads in accordance with an illustrative embodiment of the invention. A thread is a sequence of steps performed, which may share memory with another thread that operates concurrently on a common microprocessor. The thread may be a code assignment to specific resources or allocations of a resource. A thread is sometimes called a thread of execution. An allocation of a resource can be time assignment or bandwidth. Initially, a data processing system initializes a stack to reference a default security configuration, such as security configuration X (step 501). For example, the data processing system may access a security configuration by placing a reference to the security configuration into a stack as shown by stack 400 of FIG. 4. A default security configuration is an initial or first security configuration used by a data processing system. Alternatively, default security configuration may be a security configuration used when the stack is empty and/or the top of stack pointer is null. The default security configuration may be the first security configuration placed on a stack, or the first security configuration referenced by the stack during a data processing system's operation.

Next, a client may access application B (step 503). The client may be a first thread executing on a computer, for example, computer system 100 of FIG. 1. The client may be authorized to access resources in accordance with security configuration X 403 of FIG. 4. However, the client may require security configuration B to complete its function. Accordingly, client, which may be a first executing thread, may connect to a second thread. Accordingly, the second thread receives an incoming request. An incoming request can be a method request. A request can come from a client, where the client can be a web browser accessing a servlet. In addition, a request can come from another application server, for example, a first server executing a first enterprise java bean can invoke a second enterprise java bean method on second server. For example, the incoming request can be an Enterprise Java Beans request or an EJB request.

Figure 6:
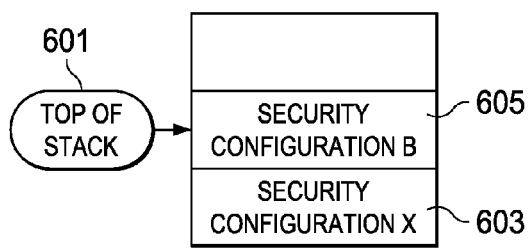
FIG. 6 illustrates the status of the security configurations in accordance with an illustrative embodiment of the invention.

In response to the incoming request, the data processing system may obtain a second thread from a thread pool to handle the request (step 505). In addition, the data processing system may switch to a first security configuration that specifies a resource, based on the incoming request. The second security configuration may be made the current security configuration by pushing security configuration B onto the stack in a manner that causes the stack pointer to point to security configuration B. For example, the second thread may push security configuration B onto the stack (step 507). In this manner, the data processing system, through instructions of the second thread, may switch the current security configuration from security configuration X to security configuration B. Switching a security configuration may involve storing the second security configuration, that is, security configuration B, to the stack, as shown in FIG. 6. Further, the processor, by operation of the second thread, may execute steps responsive to the incoming request, where execution of the steps is based on the security configuration B.

FIG. 6 illustrates the status of the security configurations in the stack at step 507 of FIG. 5. Stack pointer 601 points to a stack element one position offset from security configuration X 603, namely, position for storing security configuration B 605. It is appreciated that each stack position may be merely a reference or pointer to the data structure that actually holds the referenced security configuration. Moreover, the stack element may interchangeably be set to carry a reference to any available security configuration. Alternatively, the stack may store the security configuration instead of a reference to the security configuration.

Returning to FIG. 5, the second thread may authenticate against security configuration B (step 509). This step may be performed using a user identifier provided by a user. Next, the second thread may authorize the user identifier against the security configuration B (step 511). Either step 509, or step 511 may grant or deny access to a resource specified in a security configuration.

Next, the second thread may execute one or more steps, methods or functions of application B (step 513). Next, the second thread may send a response (step 515). The response may be data passed to the first thread. Next, the second thread may pop the stack (step 517). By popping the stack, the second thread may restore the initial or first security configuration X to be the current security configuration. For example, by popping the stack, the stack may change states from the state depicted in FIG. 6, to the state depicted in FIG. 4. While the stack is in the configuration of FIG. 4, all future resource accesses will be made consistent with the criteria expressed in the security configuration X 403. A pop can occur by changing the stack pointer to point to the stack element occupying a space below the current the element currently referenced by the stack pointer. In other words, the next older element added to the stack is now exposed as the top of the stack.

Returning to FIG. 5, the second thread changes to a waiting state (step 519). Processing may terminate thereafter.

Figure 7:
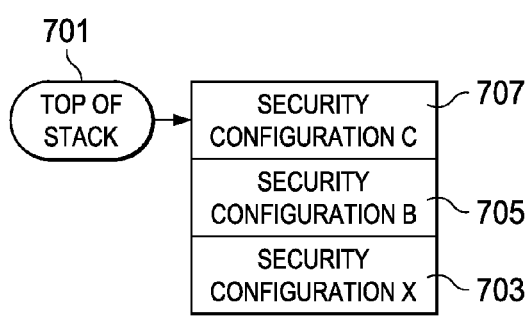
FIG. 7 is an optional third state of the stack in accordance with an illustrative embodiment of the invention.

FIG. 7 is an optional third state of the stack, in accordance with an illustrative embodiment of the invention. Potentially, the second thread may make a further request to a third resource. Responsive to such a request, the computer system may push a further security configuration onto the stack, for example, security configuration C 707. Accordingly, stack pointer 701 can point to this newly added security configuration. From this state, security configuration B 705 and security configuration X 703 can be made available to executing threads only after popping security configuration C 707.

Accordingly, one or more illustrative embodiments provide a method to revise security associations to a resource as defined in a security configuration in order to allow prompt execution of a request.

The corresponding structures, materials, acts, and equivalents of all means or step plus function elements in the claims below are intended to include any structure, material, or act for performing the function in combination with other claimed elements as specifically claimed.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for switching security configurations, the computer implemented method comprising:
   accessing a first security configuration, wherein the first security configuration comprises at least one security parameter, via a thread of execution;
   receiving an incoming request;
   responsive to receiving the incoming request, switching to a second security configuration that specifies a resource, based on the incoming request;
   storing the second security configuration or a reference to the second security configuration to a stack;
   authenticating the incoming request based on the second security configuration;
   granting or denying access to the resource;
   executing a method referenced in the incoming request; and
   responsive to completing the method, restoring to the first security configuration, wherein the incoming request is an Enterprise Java Beans request, and wherein the second security configuration is a second user registry.

2. A computer implemented method for switching security configurations, the computer implemented method comprising:
   accessing a first security configuration, wherein the first security configuration comprises at least one security parameter, via a thread of execution, wherein the first security configuration comprises a security configuration used in the absence of data referenced by a top of stack;

receiving an incoming request;

responsive to receiving the incoming request, switching to a second security configuration that specifies a resource, based on the incoming request;

storing the second security configuration or a reference to the second security configuration to a stack;

authenticating the incoming request based on the second security configuration;

granting or denying access to the resource;

executing a method referenced in the incoming request; and responsive to completing the method, restoring to the first security configuration, wherein the first security configuration comprises a security configuration used in the absence of data referenced by a top of stack.

3. A computer implemented method for switching security configurations, the computer implemented method comprising:

accessing a first security configuration, wherein the first security configuration comprises at least one security parameter, via a thread of execution, wherein the first security configuration comprises a security configuration used in the absence of data referenced by a top of stack;

receiving an incoming request;

responsive to receiving the incoming request, switching to a second security configuration that specifies a resource, based on the incoming request;

storing the second security configuration or a reference to the second security configuration to a stack;

authenticating the incoming request based on the second security configuration;

granting or denying access to the resource;

executing a method referenced in the incoming request; and responsive to completing the method, restoring to the first security configuration, wherein the at least one security parameter is authorization data.

4. A computer program product for switching security configurations, the computer program product comprising:

one or more computer-readable storage devices having computer readable program code embodied therewith, the computer program product comprising:

computer readable program code configured to access the first security configuration, wherein the first security configuration comprises at least one security parameter, via a thread of execution;

computer readable program code configured to receive an incoming request;

computer readable program code configured to switch to a second security configuration that specifies a resource, based on the incoming request, responsive to receiving the incoming request;

computer readable program code configured to store the second security configuration or a reference to the second security configuration to a stack;

computer readable program code configured to authenticate the incoming request based on the second security configuration;

computer readable program code configured to grant or deny access to the resource;

computer readable program code configured to execute a method referenced in the incoming request; and computer readable program code configured to restore to a first security configuration, responsive to completing the method, wherein the first security configuration comprises a security configuration used in the absence of data referenced by a top of stack.

5. A data processing system comprising:

a bus;

a storage device connected to the bus, wherein computer usable code is located in the storage device;

a communication unit connected to the bus; and a processing unit connected to the bus, wherein the processing unit executes the computer usable code for switching security configurations, wherein the processing unit executes the computer usable code to access a first security configuration, wherein the first security configuration comprises at least one security parameter, wherein accessing the first security configuration is via a thread of execution; receive an incoming request; switch to a second security configuration that specifies a resource, based on the incoming request, responsive to receiving the incoming request; store the second security configuration or a reference to the second security configuration to a stack; authenticate the incoming request based on the second security configuration; grant or deny access to the resource; execute a method referenced in the incoming request; and restore to the first security configuration, responsive to completing the method, wherein the first security configuration comprises a security configuration used in the absence of data referenced by a top of stack.

* * * * *